US012756100B2

(12) United States Patent
Bai et al.

(10) Patent No.: US 12,756,100 B2
(45) Date of Patent: Oct. 6, 2026

(54) PATCH ANTENNA AND ANTENNA ARRAY

(71) Applicant: Alpha Networks Inc., Hsinchu (TW)

(72) Inventors: Ta-Chuan Bai, Hsinchu (TW); Ding-Bing Lin, Hsinchu (TW); Sung-Nien Hsieh, Hsinchu (TW); Shu-Ming Yang, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 82 days.

(21) Appl. No.: 18/808,693

(22) Filed: Aug. 19, 2024

(65) Prior Publication Data

US 2025/0329940 A1 Oct. 23, 2025

(30) Foreign Application Priority Data

Apr. 23, 2024 (TW) ................................. 113115077

(51) Int. Cl.
*H01Q 9/04* (2006.01)
*H01Q 1/52* (2006.01)
(Continued)

(52) U.S. Cl.
CPC ........... *H01Q 9/0414* (2013.01); *H01Q 1/523* (2013.01); *H01Q 19/005* (2013.01); *H01Q 21/065* (2013.01)

(58) Field of Classification Search
CPC ........... H01Q 1/52–523; H01Q 9/0414; H01Q 21/065; H01Q 19/005
See application file for complete search history.

(56) References Cited

U.S. PATENT DOCUMENTS 6,104,348 A * 8/2000 Karlsson ................ H01Q 21/08
343/834
11,264,702 B1 * 3/2022 Chieh .................. H01Q 21/065
(Continued)

FOREIGN PATENT DOCUMENTS

CN 112448164 A * 3/2021 ............. H01Q 1/526
CN 118645801 A * 9/2024 ......... H01Q 21/0006
(Continued)

OTHER PUBLICATIONS

Search Report appended to an Office Action, which was issued to Taiwanese counterpart application No. 113115077 by the TIPO on Sep. 19, 2025, with an English translation thereof (2 pages).
(Continued)

*Primary Examiner* — Ab Salam Alkassim, Jr.
(74) *Attorney, Agent, or Firm* — HSML P.C.

(57) ABSTRACT

A patch antenna includes a first substrate, a second substrate and a substrate module that are stacked from top to bottom, a driving radiative element that is disposed below the second substrate, and a parasitic radiative element that is disposed above the first substrate. The patch antenna further includes a first feed-in line and a second feed-in line that are disposed below the substrate module. The patch antenna further includes a first feed-out probe and a second feed-out probe, each of which extends from below the driving radiative element from top to bottom, and penetrates the substrate module. When the driving radiative element receives an electromagnetic wave, a portion of the electromagnetic wave is sequentially and electromagnetically coupled to the first feed-out probe and the first feed-in line, and another portion of the electromagnetic wave is sequentially and electromagnetically coupled to the second feed-out probe and the second feed-in line.

8 Claims, 14 Drawing Sheets

(51) Int. Cl.
*H01Q 19/00* (2006.01)
*H01Q 21/06* (2006.01)

(56) References Cited

U.S. PATENT DOCUMENTS

| | | | | |
|---|---|---|---|---|
| 11,532,894 | B2 * | 12/2022 | Kim | H01Q 21/0006 |
| 11,588,222 | B2 * | 2/2023 | Ryoo | H01Q 5/40 |
| 2016/0064830 | A1 * | 3/2016 | Jervis | H01Q 9/285 343/798 |
| 2020/0021037 | A1 * | 1/2020 | Wu | H01Q 9/0457 |
| 2020/0052396 | A1 * | 2/2020 | Sakai | H01Q 15/24 |
| 2020/0106181 | A1 * | 4/2020 | Avser | H01Q 1/243 |
| 2020/0106192 | A1 * | 4/2020 | Avser | H01Q 1/405 |
| 2020/0373672 | A1 * | 11/2020 | Paulotto | H01Q 5/378 |
| 2021/0083380 | A1 * | 3/2021 | Takayama | H01Q 5/28 |
| 2021/0313703 | A1 * | 10/2021 | Stanley | H01Q 21/0006 |
| 2022/0166149 | A1 * | 5/2022 | So | H01Q 5/307 |
| 2023/0032019 | A1 * | 2/2023 | Peng | H01Q 9/0407 |
| 2023/0039854 | A1 * | 2/2023 | Cao | H01Q 13/103 |
| 2024/0113433 | A1 * | 4/2024 | Onaka | H01Q 9/0442 |
| 2024/0258700 | A1 * | 8/2024 | Hasegawa | H01Q 9/045 |
| 2024/0266744 | A1 * | 8/2024 | Kwon | H01Q 9/045 |
| 2025/0273865 | A1 * | 8/2025 | Bai | H01Q 21/26 |
| 2025/0300362 | A1 * | 9/2025 | Xiang | H01Q 21/065 |
| 2025/0329941 | A1 * | 10/2025 | Chen | H01Q 19/005 |

FOREIGN PATENT DOCUMENTS

| | | | | | |
|---|---|---|---|---|---|
| JP | 2012204916 | A | * | 10/2012 | H01Q 19/005 |
| JP | 2020043515 | A | * | 3/2020 | H01Q 9/0428 |
| KR | 101766216 | B1 | * | 8/2017 | H01Q 1/50 |
| NO | 320921 | B1 | * | 2/2006 | H01Q 5/378 |
| TW | I783595 | B | | 11/2022 | |

OTHER PUBLICATIONS

Rudraishwarya Banerjee et al., "A 22-28 GHz Polarization-Reconfigurable Flat-Panel 8x8 Tx/Rx Phased Array Antenna With Uniquely Arranged Novel Radiating Elements for CubeSat Communication", IEEE Transactions on Antennas and Propagation, vol. 71, No. 5, May 2023, pp. 4138-4152.

Search Report issued to European counterpart application No. 24194713.4 by the EPO on Feb. 6, 2025.

* cited by examiner

PATCH ANTENNA AND ANTENNA ARRAY

CROSS-REFERENCE TO RELATED APPLICATION

This application claims priority to Taiwanese Invention Patent Application No. 113115077, filed on Apr. 23, 2024, the entire disclosure of which is incorporated by reference herein.

FIELD

The disclosure relates to a patch antenna and an antenna array, and more particularly to a patch antenna and an antenna array that are adapted for low-earth orbit satellite communication.

BACKGROUND

As communication technology and integrated circuit technology advances, components of consumer electronic products are gradually being miniaturized. With the growing demands in wireless communication, consumers will be demanding for an antenna that has advantages such as a lower cost, a smaller size, and better performance. Among various antenna technologies, patch antennas not only hold the abovementioned advantages, but are also easy to manufacture, are easily integrated into other circuits, and have a high level of design diversity. As such, patch antennas are widely applied to various electronic products.

FIG. 1 shows a patch antenna disclosed in Taiwanese Invention Patent Publication No. TWI783595B. The patch antenna includes a dielectric substrate 95, a radiating metal arm 91, a U-shaped slot 92, a ground metal plate (not shown), two parasitic metal arms 94, and two feed-in slots 93. The dielectric substrate 95 includes a first surface, a second surface, and a plurality of side surfaces arranged circumferentially between the first surface and the second surface. The radiating metal arm 91 is disposed on the first surface, and may be in a shape of a regular rectangle or polygon, or an irregular ellipse, loop, or fan shape. The U-shaped slot 92 is formed within the radiating metal arm 91. The ground metal plate is disposed on the second surface. The parasitic metal arms 94 extend from the ground metal plate to the first surface through one of the side surfaces, and are adjacent to but not connected to the radiating metal arm 91. The feed-in slots 93 are disposed between the radiating metal arm 91 and the parasitic metal arms 94. Since the patch antenna only has one substrate (i.e., the dielectric substrate 95), the radiating metal arm 91 and the parasitic metal arms 94 need to be disposed on the same surface (i.e., the first surface) of the dielectric substrate 95. The U-shaped slot 92 and the parasitic metal arms 94 are capable of broadening an operating frequency band of the patch antenna, which is 98 MHz, but there is still space for improvements.

SUMMARY

Therefore, an object of the disclosure is to provide a patch antenna and an antenna array that can alleviate at least one of the drawbacks of the prior art.

According to an aspect of the disclosure, a patch antenna includes a first substrate, a second substrate, a substrate module, a driving radiative element, a parasitic radiative element, a first feed-in line, a second feed-in line, a first feed-out probe and a second feed-out probe. The first substrate, the second substrate and the substrate module are stacked from top to bottom. The driving radiative element is disposed on a lower surface of the second substrate. The parasitic radiative element is disposed on an upper surface of the first substrate. The first feed-in line and the second feed-in line are disposed on a lower surface of the substrate module. Each of the first feed-out probe and the second feed-out probe extends from a lower surface of the driving radiative element from top to bottom, and penetrates the substrate module. The first feed-out probe is electrically connected to the first feed-in line, and the second feed-out probe is electrically connected to the second feed-in line. In response to the driving radiative element receiving an input electromagnetic wave, a portion of the input electromagnetic wave is sequentially and electromagnetically coupled to the first feed-out probe and the first feed-in line, and another portion of the input electromagnetic wave is sequentially and electromagnetically coupled to the second feed-out probe and the second feed-in line.

According to another aspect of the disclosure, an antenna array includes a first antenna, a second antenna, a third antenna and a fourth antenna, each of which includes a patch antenna described above. A center of the second antenna is aligned with a center of the first antenna in a first direction, and the second antenna is offset from the first antenna in a counterclockwise orientation by 90 degrees. A center of the third antenna is aligned with the center of the second antenna in a second direction, and the third antenna is offset from the second antenna in a counterclockwise orientation by 90 degrees. A center of the fourth antenna is aligned with the center of the third antenna in the first direction, and the fourth antenna is offset from the third antenna in a counterclockwise orientation by 90 degrees.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
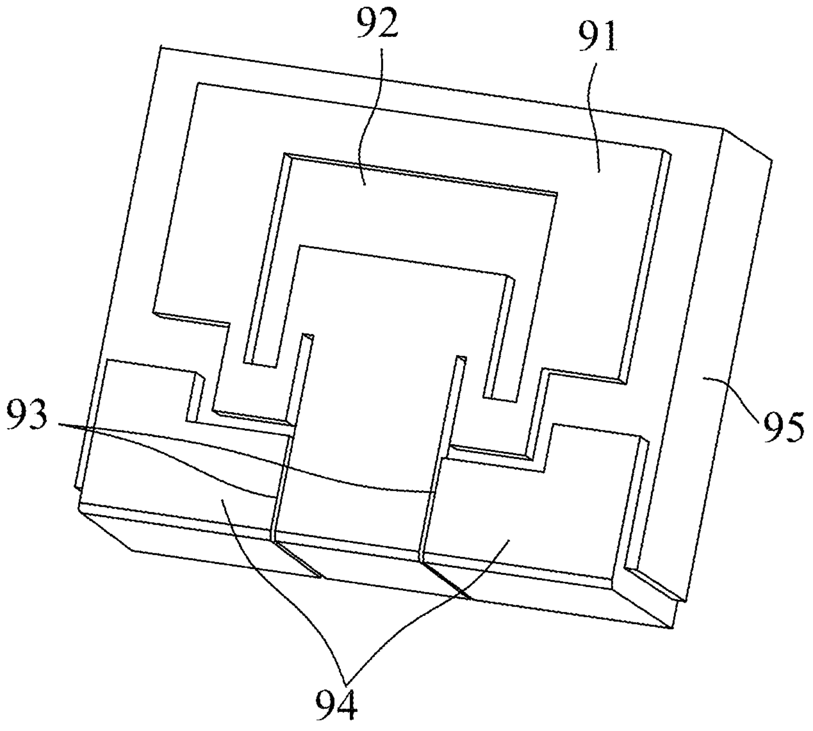
FIG. 1 PRIOR ART
FIG. 1 is a perspective view illustrating a patch antenna of the prior art.
Figure 2:
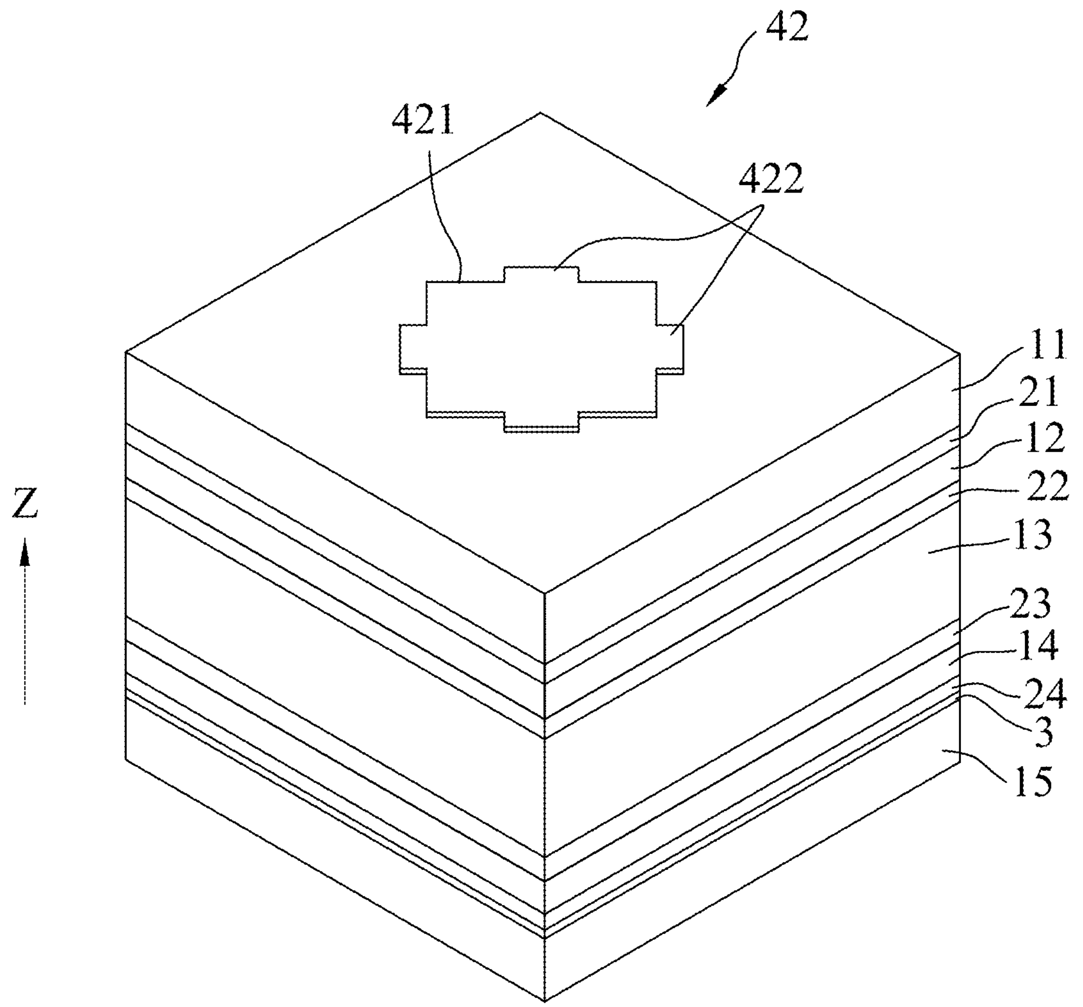
FIG. 2 is a perspective view illustrating a patch antenna according to an embodiment of the disclosure.
Figure 3:
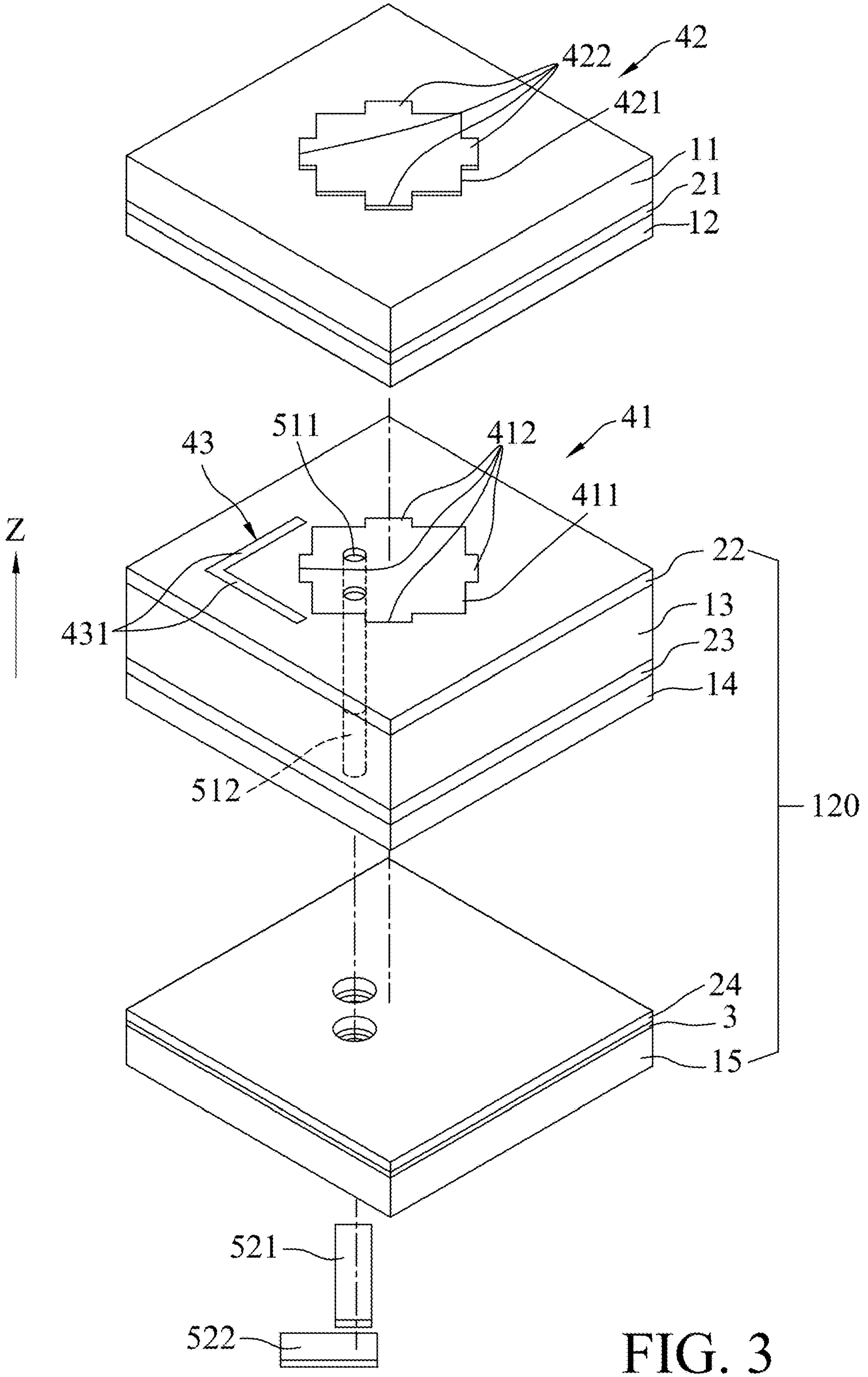
FIG. 3 is an exploded perspective view of the patch antenna according to the embodiment.
Figure 4:
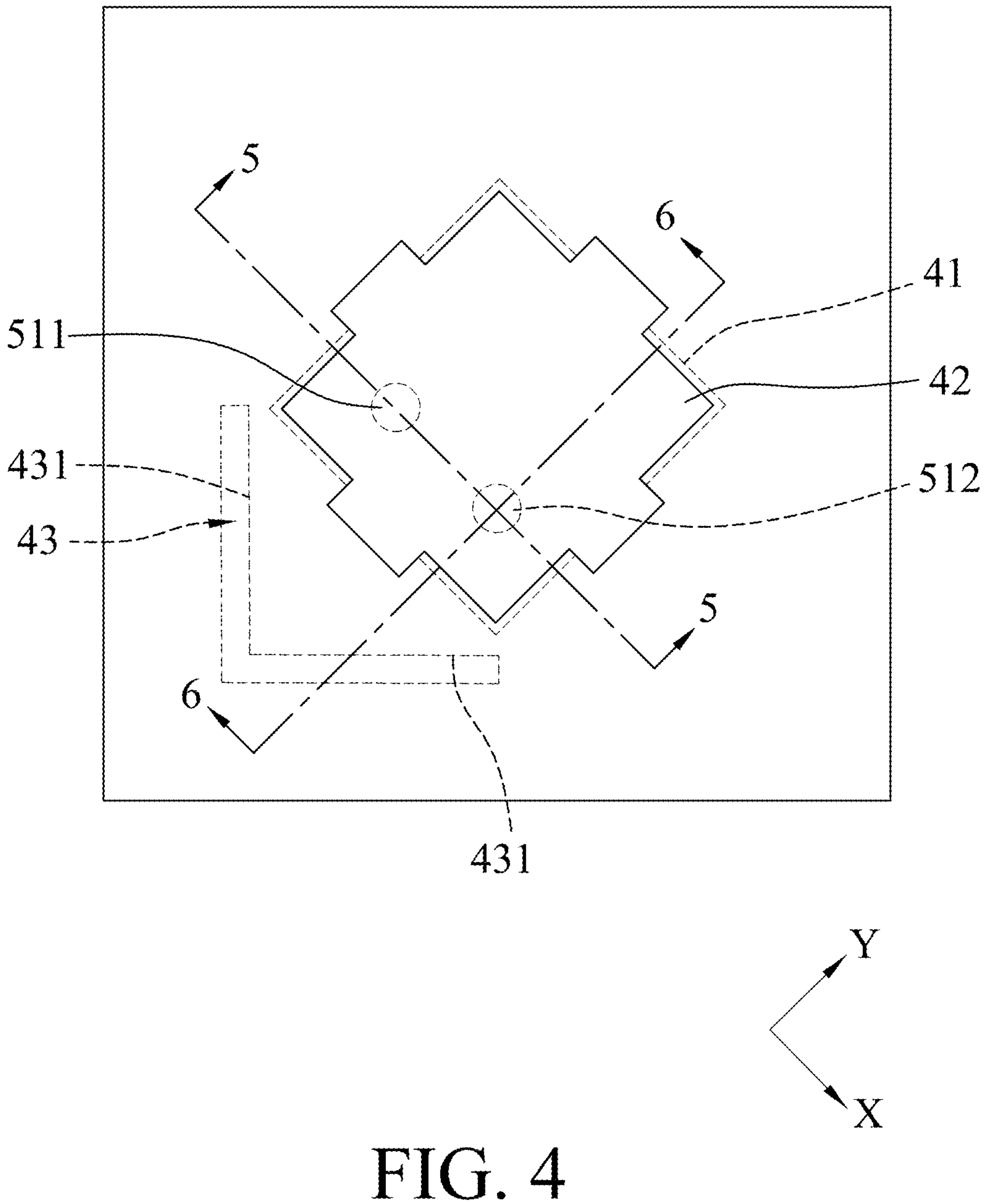
FIG. 4 is a top view of the patch antenna according to the embodiment.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Referring to FIGS. 2 to 6, a patch antenna according to an embodiment of the disclosure includes a first substrate 11, a first adhesive layer 21, a second substrate 12, a substrate module 120, a driving radiative element 41, a parasitic radiative element 42, a parasitic resonator 43, a first feed-in line 521, a second feed-in line 522, a first feed-out probe 511 and a second feed-out probe 512.

The first substrate 11, the first adhesive layer 21, the second substrate 12 and the substrate module 120 are stacked from top to bottom in the given order along a direction that is reverse to a Z-direction pointing from bottom to top.

The substrate module 120 includes a second adhesive layer 22, a third substrate 13, a third adhesive layer 23, a fourth substrate 14, a fourth adhesive layer 24, a ground layer 3 and a fifth substrate 15 that are stacked from a lower surface of the second substrate 12 from top to bottom in the given order along the direction that is reverse to the Z-direction.

Each of the first substrate 11, the first adhesive layer 21, the second substrate 12, the second adhesive layer 22, the third substrate 13, the third adhesive layer 23, the fourth substrate 14, the fourth adhesive layer 24 and the fifth substrate 15 is made of a dielectric material. The ground layer 3 is made of metal.

The driving radiative element 41 is disposed on the lower surface of the second substrate 12, and includes a driving patch 411 and four driving stubs 412. The driving patch 411 is a square metal sheet with four borders. Each of the driving stubs 412 is a rectangular metal sheet, and the driving stubs 412 are connected to the four borders of the driving patch 411, respectively. Two centers respectively of two of the driving stubs 412 are aligned with a center of the driving patch 411 in a Y-direction that is, for example, perpendicular to the Z-direction. Two centers respectively of another two of the driving stubs 412 are aligned with the center of the driving patch 411 in an X-direction that is, for example, perpendicular to the Y-direction and the Z-direction. The driving stubs 412 are used for broadening an operating frequency band of the patch antenna of this embodiment.

The parasitic radiative element 42 is disposed on an upper surface of the first substrate 11, and includes a parasitic patch 421 and four parasitic stubs 422. The parasitic patch 421 is a square metal sheet with four borders. Each of the parasitic stubs 422 is a rectangular metal sheet, and the parasitic stubs 422 are connected to the four borders of the parasitic patch 421, respectively. Two centers respectively of two of the parasitic stubs 422 are aligned with a center of the parasitic patch 421 in the Y-direction, and two centers respectively of another two of the parasitic stubs 422 are aligned with the center of the parasitic patch 421 in the X-direction. The parasitic stubs 422 are used for broadening the operating frequency band of the patch antenna of this embodiment.

A projection, in the Z-direction, of a center of the driving radiative element 41 on the parasitic radiative element 42 coincides with a center of the parasitic radiative element 42.

The parasitic resonator 43 is disposed on the lower surface of the second substrate 12, and is a sheet that is made of metal and that has an L shape. The parasitic resonator 43 includes two arms 431, where an angle between the two arms 431 of the parasitic resonator 43 faces the driving radiative element 41. The parasitic resonator 43 is used for suppressing interference between a first signal that passes through the first feed-in line 521 and a second signal that passes through the second feed-in line 522.

The first feed-in line 521 and the second feed-in line 522 are disposed on a lower surface of the fifth substrate 15. Each of the first feed-out probe 511 and the second feed-out probe 512 extends from a lower surface of the driving patch 411 from top to bottom in the direction that is reverse to the Z-direction, and penetrates the substrate module 120. The first feed-out probe 511 is electrically connected to the first feed-in line 521, and the second feed-out probe 512 is electrically connected to the second feed-in line 522.

When the driving radiative element 41 receives an input electromagnetic wave, a portion of the input electromagnetic wave is sequentially and electromagnetically coupled to the first feed-out probe 511 and the first feed-in line 521, and another portion of the input electromagnetic wave is sequentially and electromagnetically coupled to the second feed-out probe 512 and the second feed-in line 522. In such a case, the parasitic resonator 43 is used for suppressing interference between the portion of the input electromagnetic wave that passes through the first feed-in line 521, and the another portion of the input electromagnetic wave that passes through the second feed-in line 522.

In this embodiment, the patch antenna is configured to operate in a frequency band from 17.7 GHz to 20.2 GHz (i.e., the operating frequency band of the patch antenna is from 17.7 GHz to 20.2 GHz), and can be used in a low-earth orbit satellite communication system.

Figure 5:
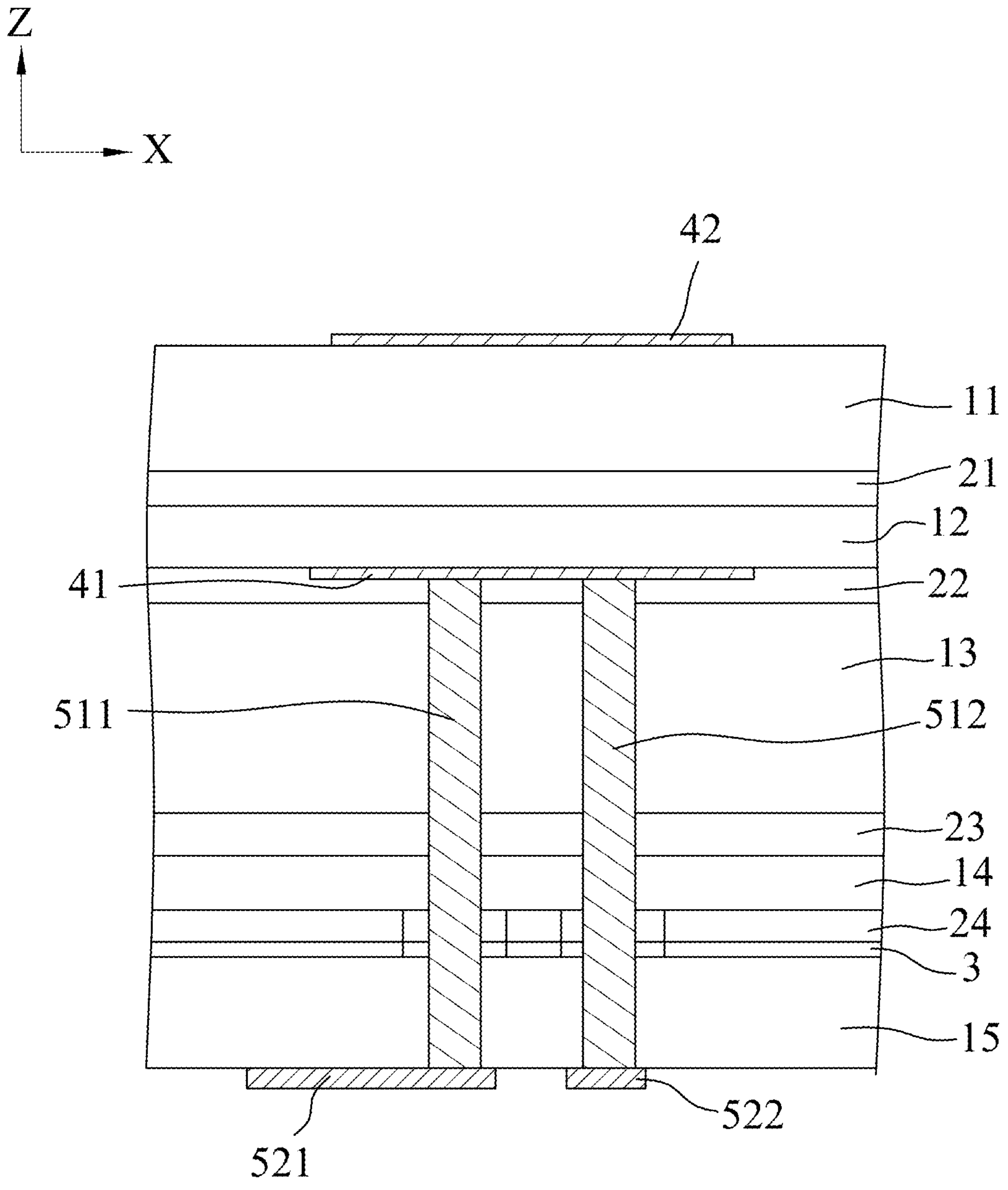
FIG. 5 is a sectional view taken along line 5-5 in FIG. 4, illustrating the patch antenna according to the embodiment.
Figure 6:
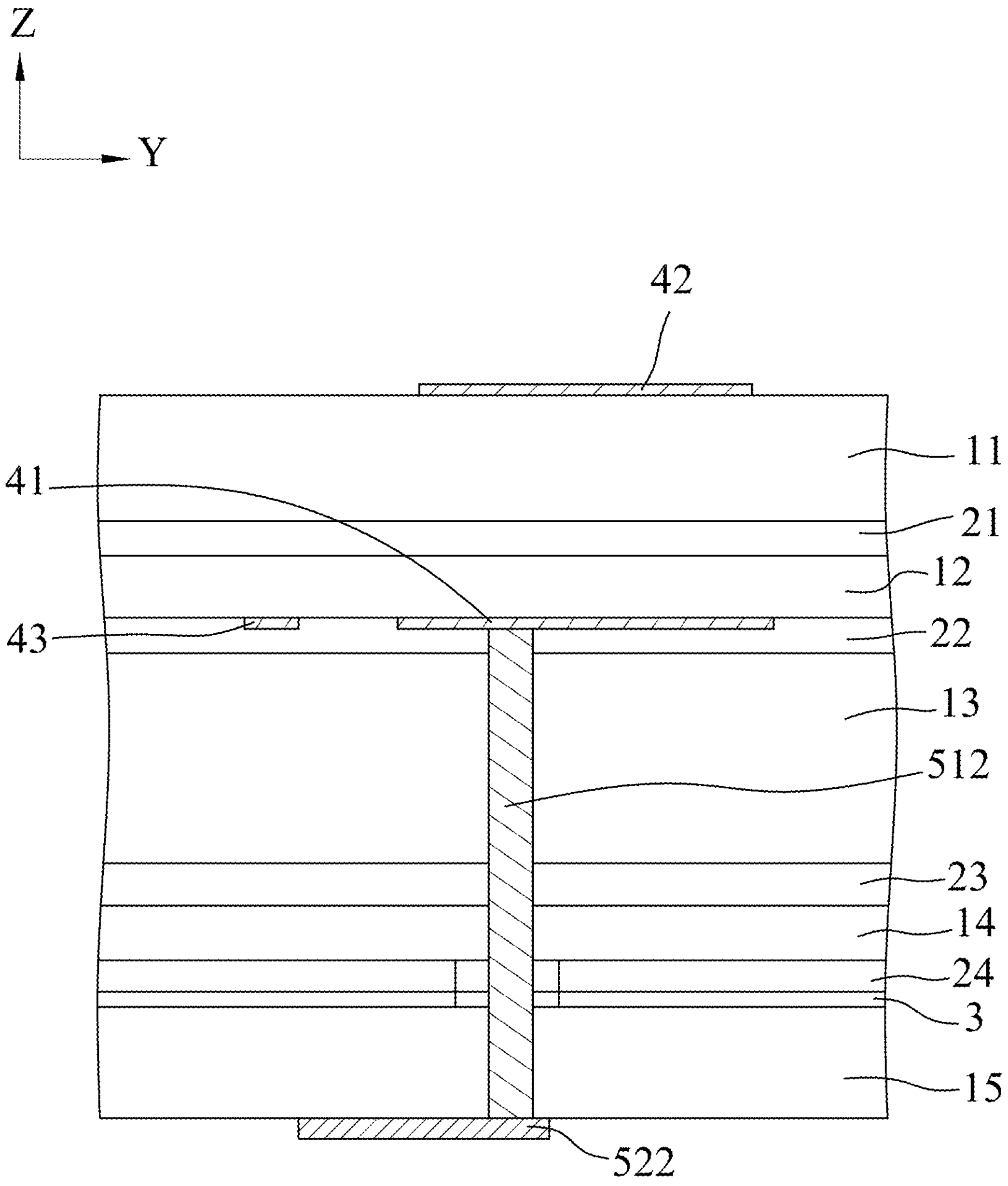
FIG. 6 is a sectional view taken along line 6-6 in FIG. 4, illustrating the patch antenna according to the embodiment.
Figure 7:
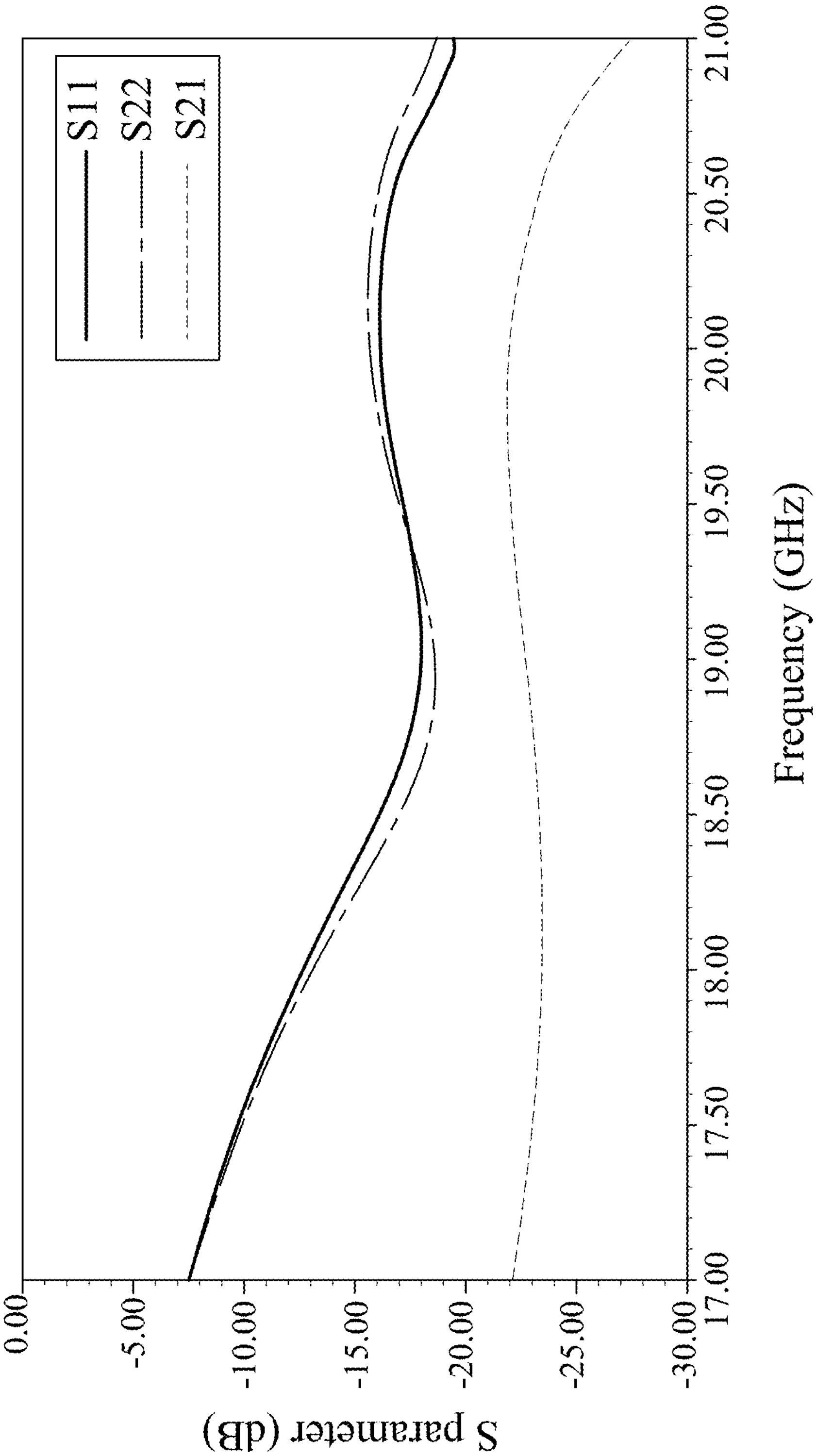
FIG. 7 is a plot illustrating various scattering parameters of the patch antenna according to the embodiment.

FIG. 7 is a plot illustrating scattering parameters (S11, S22, and S21) of the patch antenna of this embodiment in a frequency range of 17 GHz to 21 GHz. Referring to FIGS. 5 and 7, the scattering parameter (S11) is a reflection coefficient at the first feed-in line 521, and is smaller than a target value of the scattering parameter (S11) (e.g., −10 dB) in the operating frequency band of the patch antenna. The scattering parameter (S22) is a reflection coefficient at the second feed-in line 522, and is smaller than a target value of the scattering parameter (S22) (e.g., −10 dB) in the operating frequency band of the patch antenna. The scattering parameter (S21) is a transmission coefficient that is related to isolation between the first feed-in line 521 and the second feed-in line 522, and is smaller than a target value of the scattering parameter (S21) (e.g., −20 dB) in the operating frequency band of the patch antenna.

Figure 8:
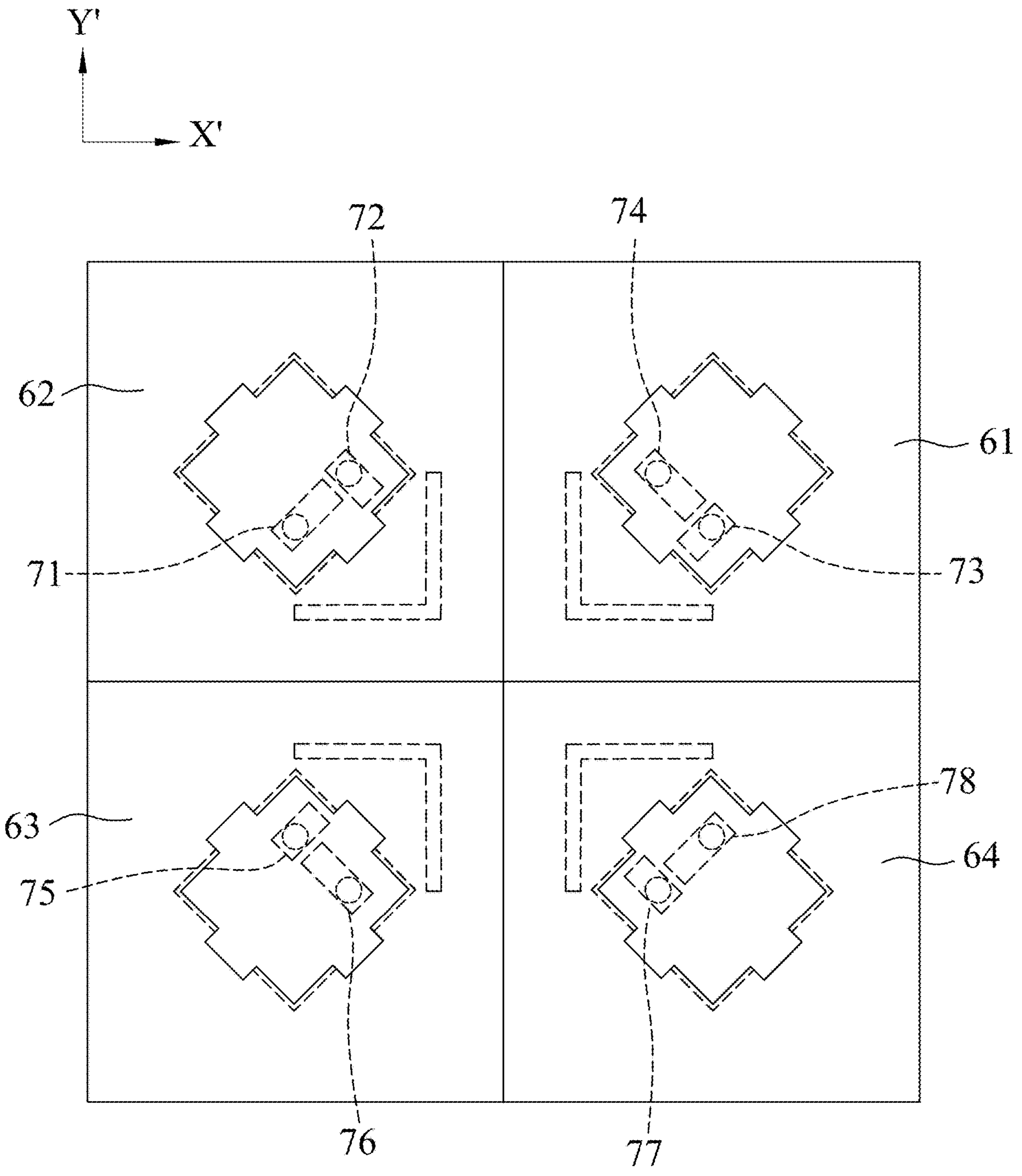
FIG. 8 is a top view illustrating an antenna array according to another embodiment of the disclosure.
Figure 9:
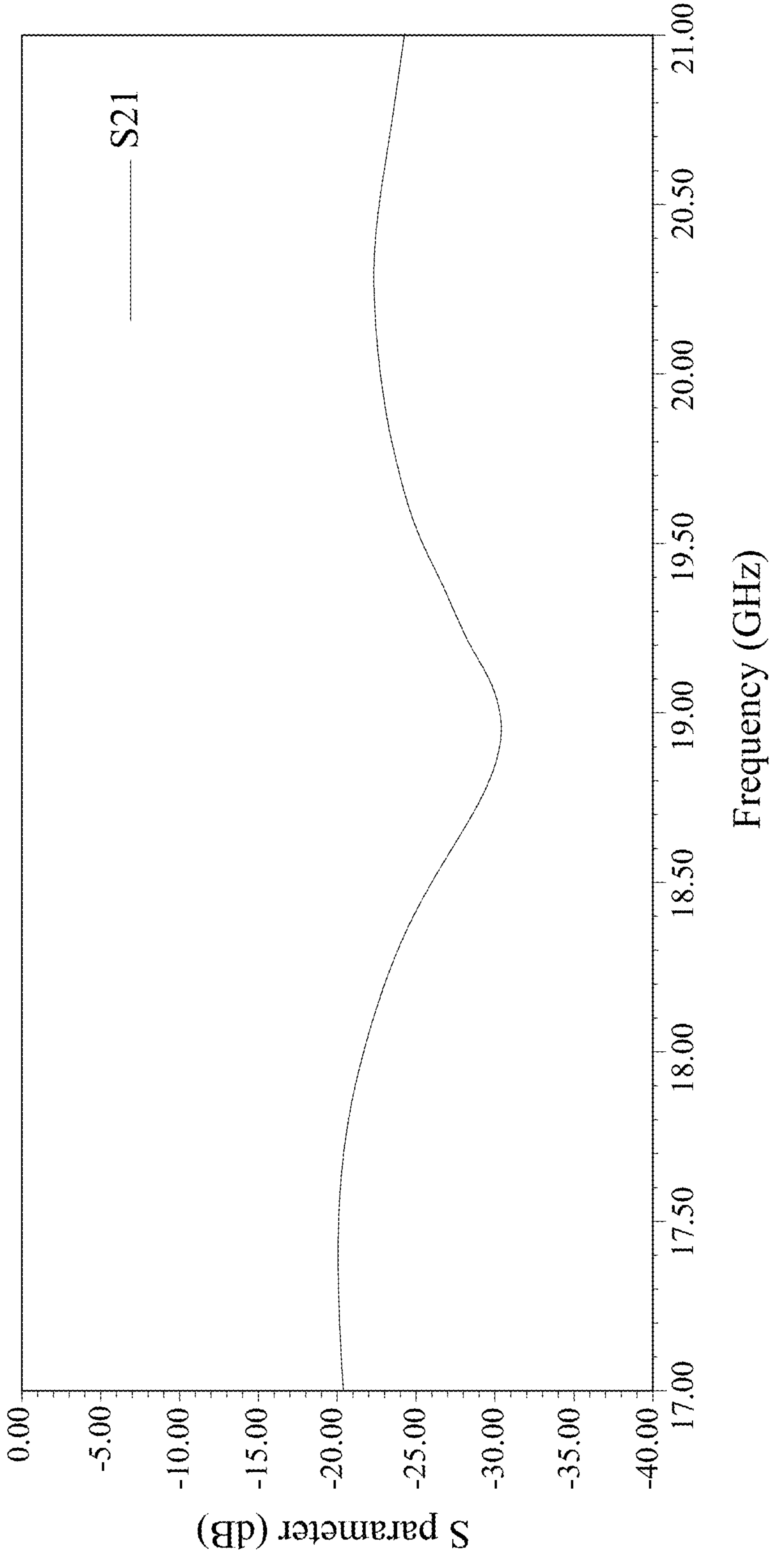
FIG. 9 is a plot illustrating a first scattering parameter of the antenna array according to the another embodiment.
Figure 10:
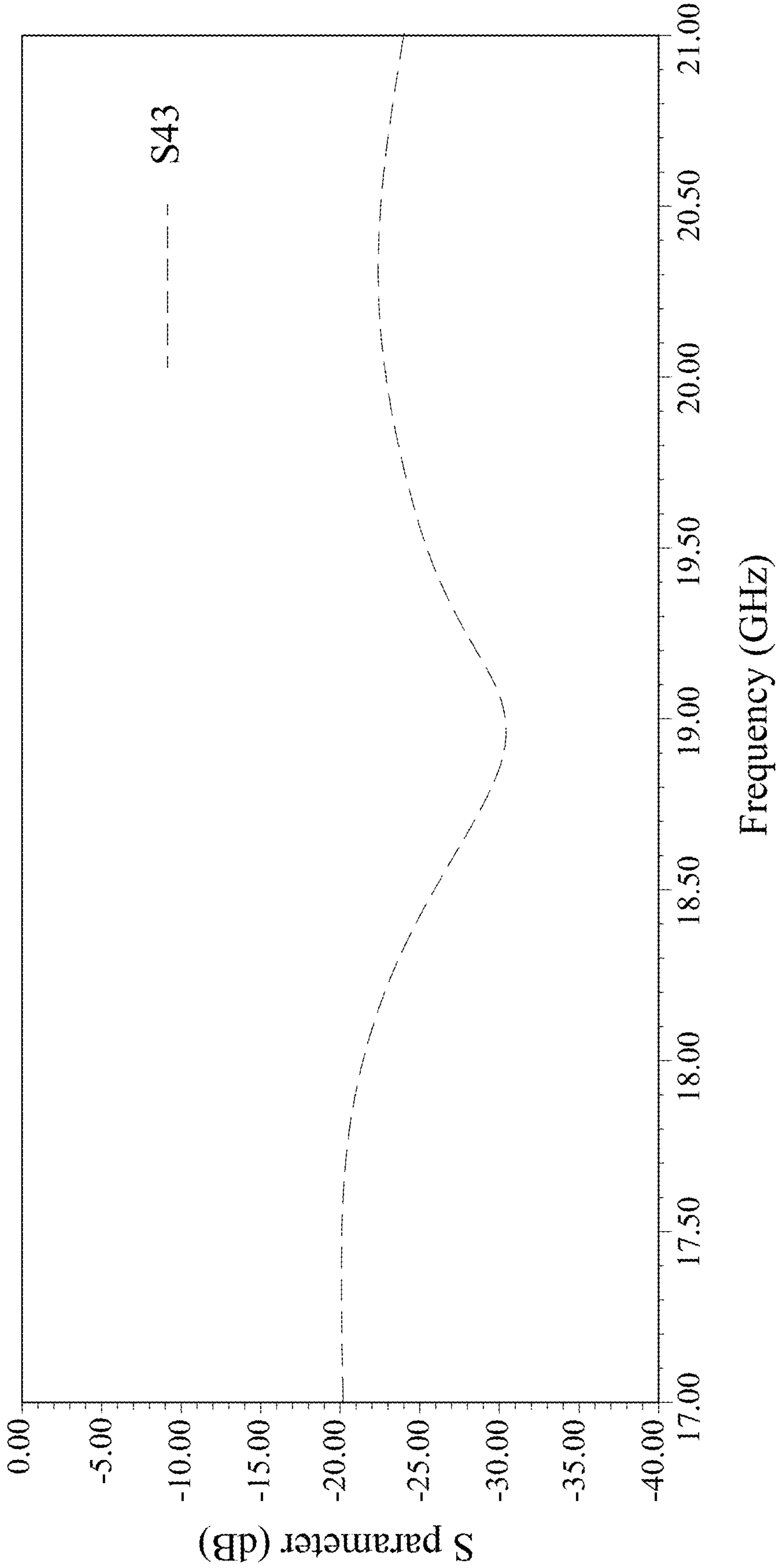
FIG. 10 is a plot illustrating a second scattering parameter of the antenna array according to the another embodiment.
Figure 11:
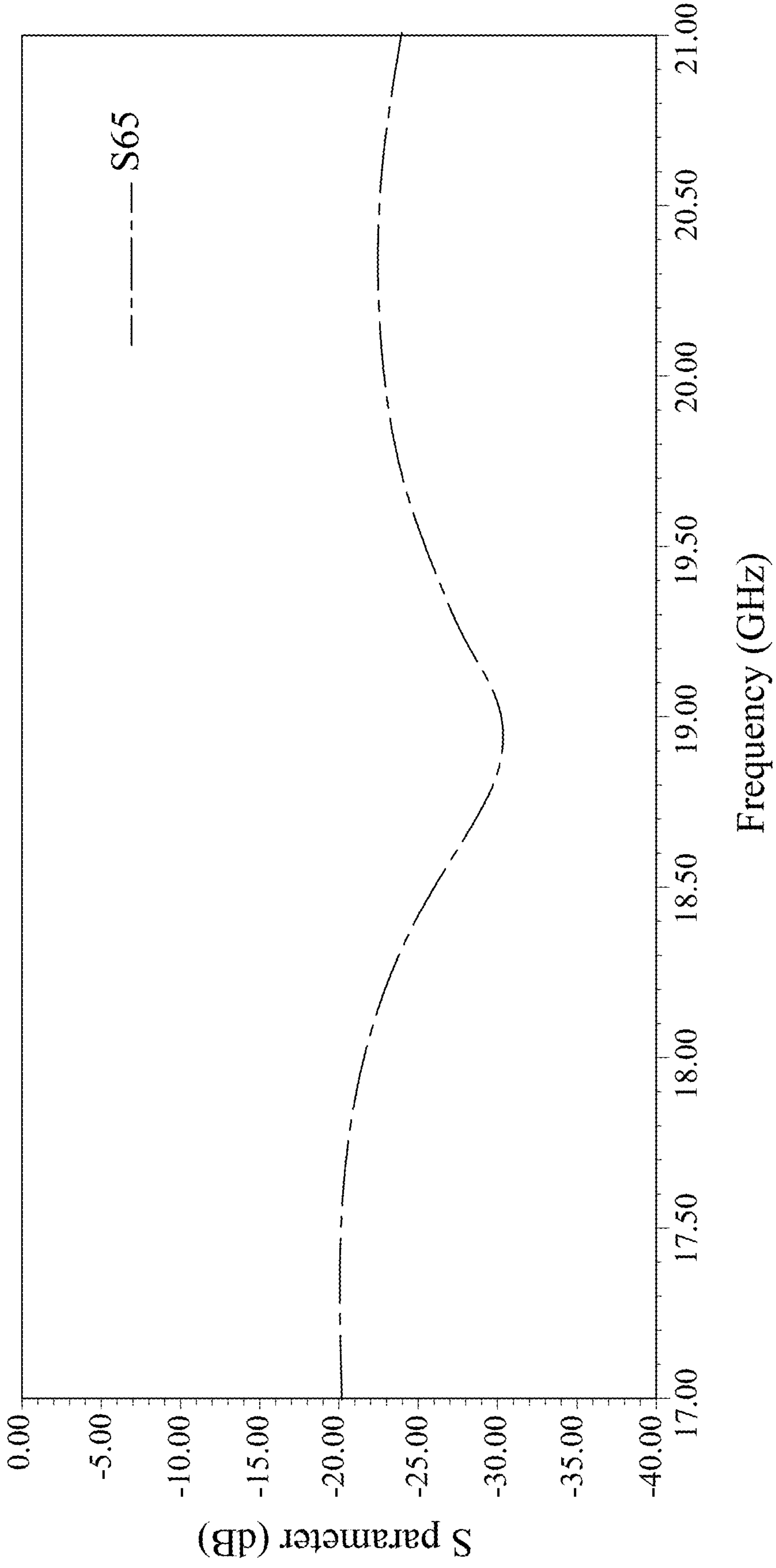
FIG. 11 is a plot illustrating a third scattering parameter of the antenna array according to the another embodiment.
Figure 12:
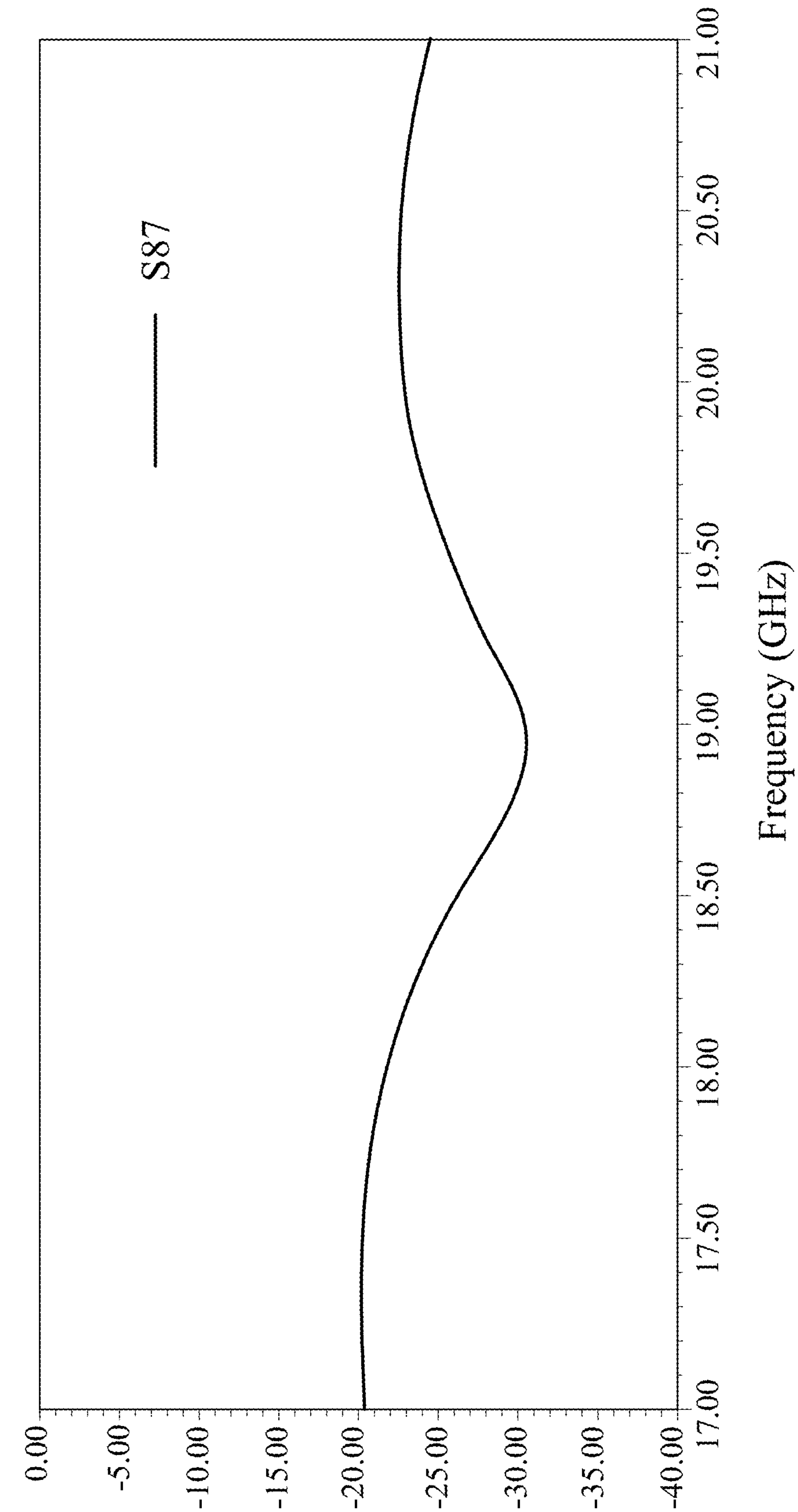
FIG. 12 is a plot illustrating a fourth scattering parameter of the antenna array according to the another embodiment.

Referring to FIG. 8, an antenna array according to an embodiment of the disclosure includes a first antenna 61, a second antenna 62, a third antenna 63 and a fourth antenna 64, each of which includes the patch antenna as mentioned above. The second antenna 62 includes a first input port 71 and a second input port 72 (respectively corresponding to the first feed-in line 521 (see FIG. 5) and the second feed-in line 522 (see FIG. 5) of the patch antenna); the first antenna 61 includes a third input port 73 and a fourth input port 74 (respectively corresponding to the second feed-in line 522 (see FIG. 5) and the first feed-in line 521 (see FIG. 5) of the patch antenna); the third antenna 63 includes a fifth input port 75 and a sixth input port 76 (respectively corresponding to the second feed-in line 522 (see FIG. 5) and the first feed-in line 521 (see FIG. 5) of the patch antenna); and the fourth antenna 64 includes a seventh input port 77 and an eighth input port 78 (respectively corresponding to the second feed-in line 522 (see FIG. 5) and the first feed-in line 521 (see FIG. 5) of the patch antenna).

A center of the second antenna 62 is aligned with a center of the first antenna 61 in an X'-direction (also referred to as a first direction), and the second antenna 62 is offset from the first antenna 61 in a counterclockwise orientation by 90 degrees. A center of the third antenna 63 is aligned with the center of the second antenna 62 in a Y'-direction (also referred to as a second direction) that is, for example, perpendicular to the X'-direction, and the third antenna 63 is offset from the second antenna 62 in a counterclockwise orientation by 90 degrees. A center of the fourth antenna 64 is aligned with the center of the third antenna 63 in the X'-direction, and the fourth antenna 64 is offset from the third antenna 63 in a counterclockwise orientation by 90 degrees.

In this embodiment, the antenna array is configured to operate in the frequency band from 17.7 GHz to 20.2 GHz (i.e., an operating frequency band of the antenna array is from 17.7 GHz to 20.2 GHz).

FIGS. 9 to 12 are plots illustrating scattering parameters (S21, S43, S65, and S87) of the antenna array of this embodiment in a frequency range of 17 GHz to 21 GHz. Specifically, FIGS. 9 to 12 illustrate polarization isolation between different two of the input ports 71-78 that are of the same one of the antennas 61-64. Referring to FIGS. 8 to 12, the scattering parameter (S21) is a transmission coefficient that is related to isolation between the second input port 72 and the first input port 71, and is smaller than a target value of the scattering parameter (S21) (e.g., −20 dB) in the operating frequency band of the antenna array. The scattering parameter (S43) is a transmission coefficient that is related to isolation between the fourth input port 74 and the third input port 73, and is smaller than a target value of the scattering parameter (S43) (e.g., −20 dB) in the operating frequency band of the antenna array. The scattering parameter (S65) is a transmission coefficient that is related to isolation between the sixth input port 76 and the fifth input port 75, and is smaller than a target value of the scattering parameter (S65) (e.g., −20 dB) in the operating frequency band of the antenna array. The scattering parameter (S87) is a transmission coefficient that is related to isolation between the eighth input port 78 and the seventh input port 77, and is smaller than a target value of the scattering parameter (S87) (e.g., −20 dB) in the operating frequency band of the antenna array.

Figure 13:
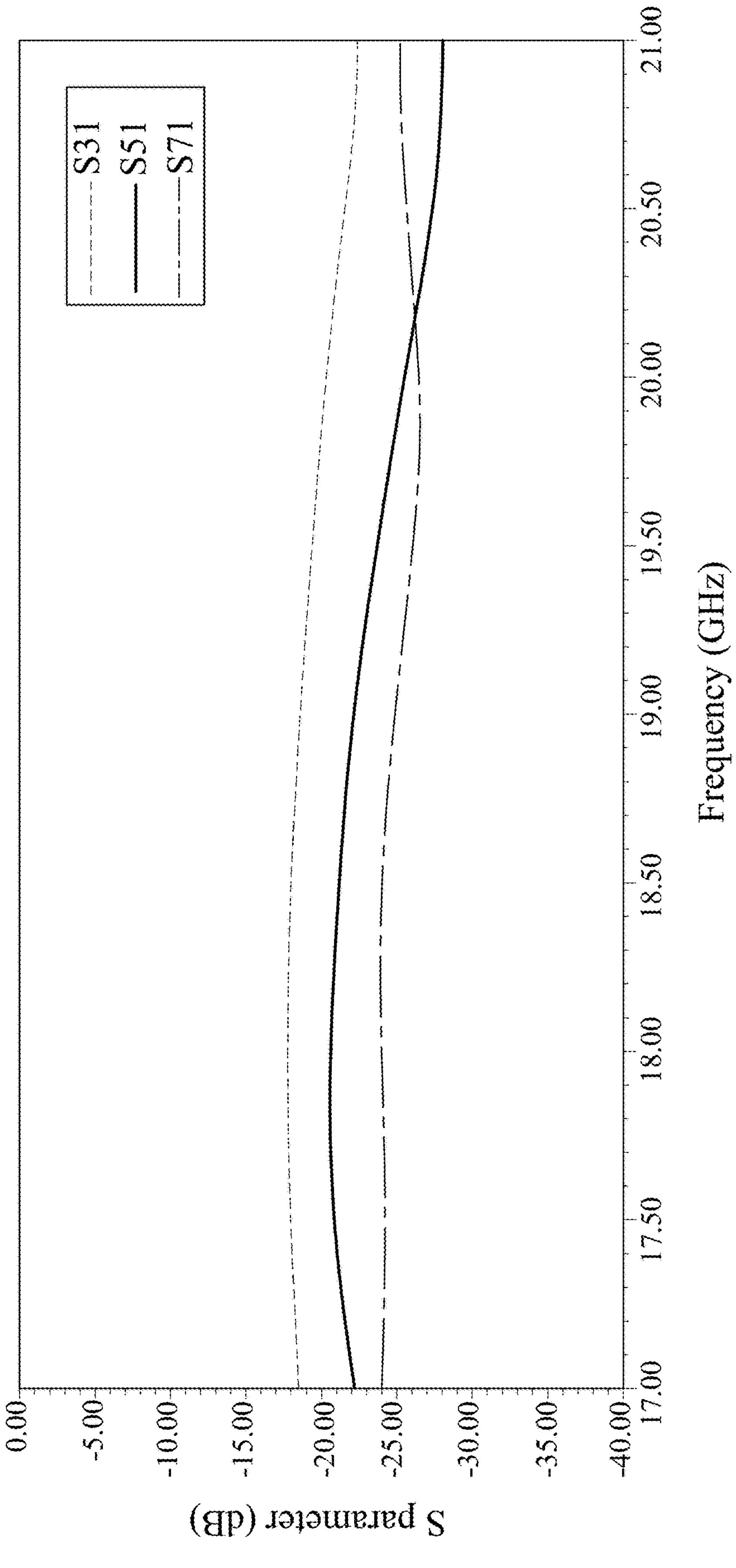
FIG. 13 is a plot illustrating various scattering parameters of the antenna array according to the another embodiment.

FIG. 13 is a plot illustrating scattering parameters (S31, S51, and S71) of the antenna array of this embodiment in a frequency range of 17 GHz to 21 GHz. Specifically, FIG. 13 illustrate polarization isolation between two of the input ports 71-78 that are respectively of two different ones of the antennas 61-64. Referring to FIGS. 8 and 13, the scattering parameter (S31) is a transmission coefficient that is related to isolation between the third input port 73 and the first input port 71, and is smaller than a target value of the scattering parameter (S31) (e.g., −15 dB) in the operating frequency band of the antenna array. The scattering parameter (S51) is a transmission coefficient that is related to isolation between the fifth input port 75 and the first input port 71, and is smaller than a target value of the scattering parameter (S51) (e.g., −15 dB) in the operating frequency band of the antenna array. The scattering parameter (S71) is a transmission coefficient that is related to isolation between the seventh input port (S77) and the first input port 71, and is smaller than a target value of the scattering parameter (S71) (e.g., −15 dB) in the operating frequency band of the antenna array.

Figure 14:
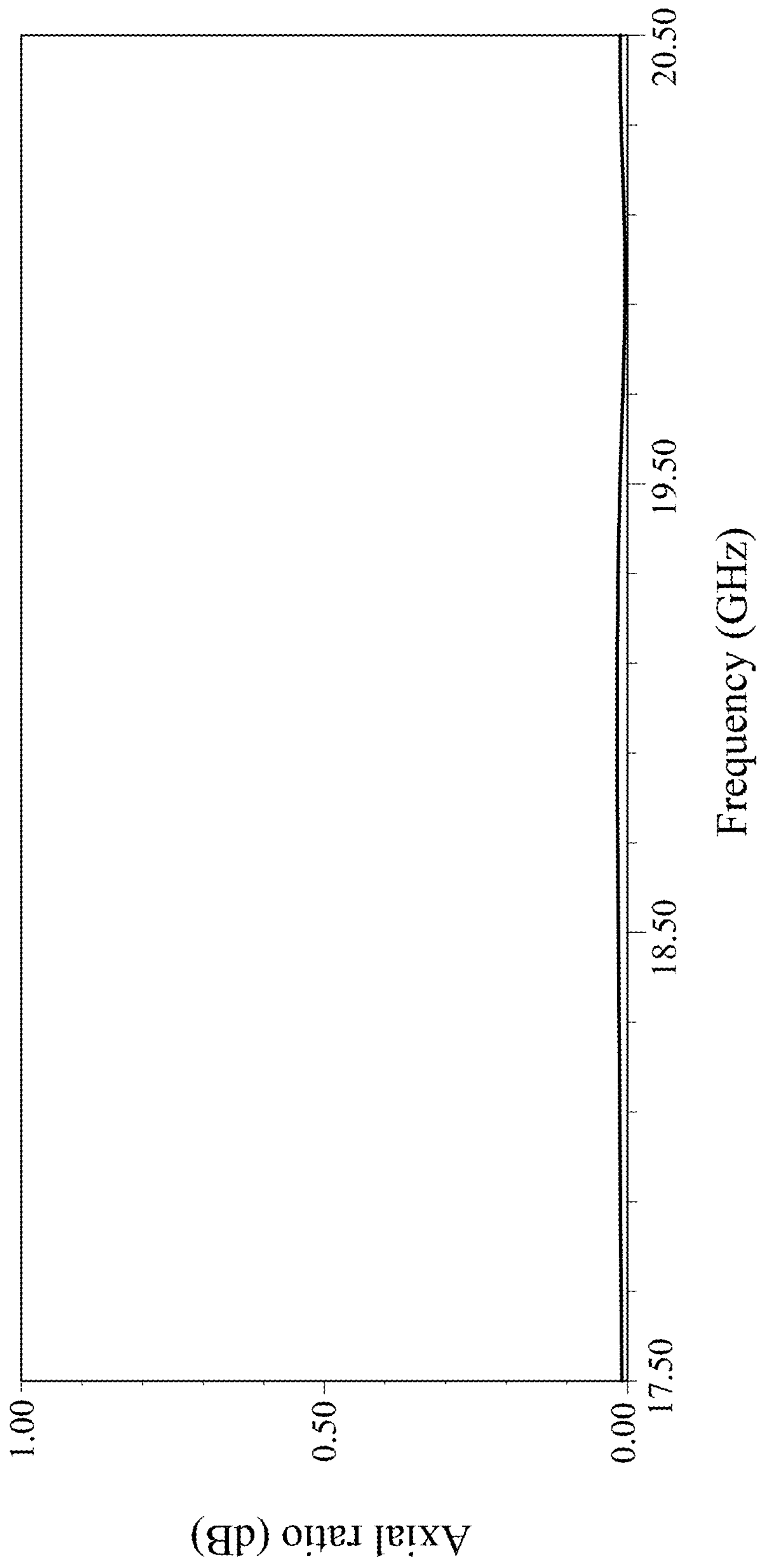
FIG. 14 is a plot illustrating an axial ratio of circular polarization of the antenna array according to the another embodiment.

FIG. 14 is a plot illustrating an axial ratio of circular polarization of the antenna array of this embodiment in a frequency range of 17.5 GHz to 20.5 GHz. As shown in FIG. 14, the axial ratio of this embodiment is smaller than a predetermined value of 0.1 dB in the operating frequency band of the antenna array.

Referring back to FIG. 3, in summary, according to the disclosure, the patch antenna includes multiple substrates 11-15 so that the driving radiative element 41 and the parasitic radiative element 42 may be disposed on different substrates (i.e., the second substrate 12 and the first substrate 11) of the patch antenna. As such, more space are available for the driving radiative element 41 to include the driving stubs 412, and for the parasitic radiative element 42 to include the parasitic stubs 422, so as to broaden the operating frequency band of the patch antenna. When the driving radiative element 41 receives an input electromagnetic wave, a portion of the input electromagnetic wave is sequentially and electromagnetically coupled to the first feed-out probe 511 and the first feed-in line 521, and another portion of the input electromagnetic wave is sequentially and electromagnetically coupled to the second feed-out probe 512 and the second feed-in line 522, thus achieving the function of signal transmission using the patch antenna. Moreover, the operating frequency band of the patch antenna ranges from 17.7 GHz to 20.2 GHz, which has a bandwidth of 2.5 GHz. Multiple patch antennas may be combined to form the antenna array, while the effect of circular polarization can be obtained without obvious cracking of the scattering parameters in the operating frequency band of the antenna array.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A patch antenna comprising:

a first substrate, a second substrate and a substrate module that are stacked from top to bottom;

a driving radiative element disposed on a lower surface of said second substrate;

a parasitic radiative element disposed on an upper surface of said first substrate;

a first feed-in line and a second feed-in line that are disposed on a lower surface of said substrate module; and a first feed-out probe and a second feed-out probe, each of which extends from a lower surface of said driving radiative element from top to bottom, and penetrates said substrate module, said first feed-out probe being electrically connected to said first feed-in line, and said second feed-out probe being electrically connected to said second feed-in line;

wherein in response to said driving radiative element receiving an input electromagnetic wave, a portion of the input electromagnetic wave is sequentially received by said first feed-out probe and said first feed-in line, and another portion of the input electromagnetic wave is sequentially received by said second feed-out probe and said second feed-in line, wherein said driving radiative element includes a driving patch and four driving stubs, two centers respectively of two of said driving stubs are aligned with a center of said driving patch in an X-direction, and two centers respectively of another two of said driving stubs are aligned with the center of said driving patch in a Y-direction, and wherein the patch antenna further comprises a parasitic resonator that is disposed on the lower surface of said second substrate, that is made of metal, and that has an L shape, wherein an angle between two arms of said parasitic resonator faces said driving radiative element, and wherein a connected position of the two arms of said parasitic resonator is aligned with the center of said driving patch and the two centers respectively of the another two of said driving stubs in the Y-direction.

2. The patch antenna as claimed in claim 1, wherein a projection of a center of said driving radiative element on said parasitic radiative element coincides with a center of said parasitic radiative element.

3. The patch antenna as claimed in claim 1, wherein said parasitic radiative element includes a parasitic patch and four parasitic stubs, two centers respectively of two of said parasitic stubs are aligned with a center of said parasitic patch in the X-direction, and two centers respectively of another two of said parasitic stubs are aligned with the center of said parasitic patch in the Y-direction.

4. The patch antenna as claimed in claim 1, wherein said parasitic resonator is configured to suppress interference between a first signal that passes through said first feed-in line and a second signal that passes through said second feed-in line.

5. The patch antenna as claimed in claim 1, wherein said substrate module includes a third substrate, a fourth substrate, a ground layer and a fifth substrate that are stacked from top to bottom.

6. The patch antenna as claimed in claim 5, wherein said first substrate, said second substrate, said third substrate, said fourth substrate and said fifth substrate are made of a dielectric material.

7. The patch antenna as claimed in claim 5, wherein said ground layer, said driving radiative element, said parasitic radiative element, said first feed-in line, said second feed-in line, said first feed-out probe and said second feed-out probe are made of metal.

8. An antenna array comprising:

a first antenna, a second antenna, a third antenna and a fourth antenna, each including said patch antenna as claimed in claim 1;

wherein a center of said second antenna is aligned with a center of said first antenna in a first direction, and said second antenna is offset from said first antenna in a counterclockwise orientation by 90 degrees;

wherein a center of said third antenna is aligned with the center of said second antenna in a second direction, and said third antenna is offset from said second antenna in a counterclockwise orientation by 90 degrees; and wherein a center of said fourth antenna is aligned with the center of said third antenna in the first direction, and said fourth antenna is offset from said third antenna in a counterclockwise orientation by 90 degrees.

* * * * *